Figure 1:
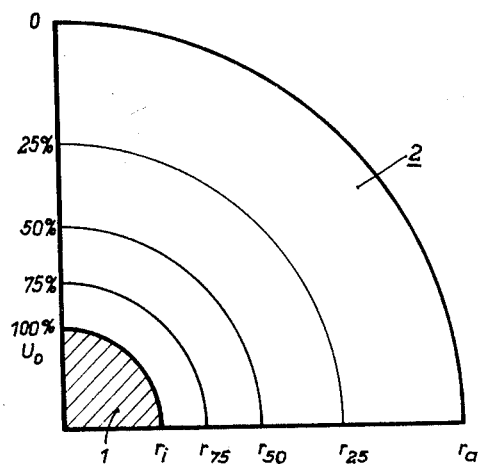

Dec. 8, 1964  U. MÜLLER  3,160,703
LAMINATED HIGH-VOLTAGE INSULATION OF
COAXIAL ELECTRIC CONDUCTORS
Filed Aug. 14, 1962  3 Sheets-Sheet 1

Inventor:
Ulrich Müller

Inventor:
Ulrich Müller

United States Patent Office 3,160,703
Patented Dec. 8, 1964

3,160,703
LAMINATED HIGH-VOLTAGE INSULATION OF COAXIAL ELECTRIC CONDUCTORS
Ulrich Müller, Berlin-Siemensstadt, Germany, assignor to Siemens-Schuckertwerke Aktiengesellschaft, Berlin-Siemensstadt and Erlangen, Germany, a corporation of Germany
Filed Aug. 14, 1962, Ser. No. 216,931
Claims priority, application Germany, Aug. 22, 1961, S 75,399; June 19, 1962, S 79,977
6 Claims. (Cl. 174—120)

My invention relates to laminated high-voltage insulation of coaxial electric conductor assemblies, for example cables, lead-in bushings, or insulated buses. It is known to form such a high-voltage resistant insulation from laminated materials, for example paper tapes, which, as a rule, are impregnated with a more or less viscous impregnation such as oil. In such a stratified insulation of coaxial conductor devices, having either a cylindrical or other, for example sector-shaped cross section, the electric potential is graduated from the conductor to the external surface of the insulation. Since the highest values of the potential gradient (electric field strength) occur immediately at the conductor, it has been general practice to place insulating materials of high electric strength in the laminations directly adjacent to the conductor. For example, there is a known high-voltage oil-pressure cable with a laminated paper insulation in which the thinnest paper tapes of the insulation, having a thickness equal to or smaller than 0.04 mm., are arranged directly in the vicinity of the conductor, whereas the thickness of the paper tape increases toward the radially outward layers.

It is an object of my invention, relating to such stratified or laminated insulations on electric conductors, to increase the breakdown voltage and hence the high-voltage resistance of the insulation for given dimensions, and to obtain such improvement at minimum cost.

To this end, and in accordance with a feature of my invention, I depart from the conventional design of a laminated high-voltage insulation of coaxial conductors, by placing into the range of the 50% equi-potential surface of the electric field a lamination of insulating material having a higher insulating resistance or dielectric strength than the insulating materials of the layers located elsewhere, including those located closer to the conductor as well as those located more closely to the external surface of the insulation.

In other words, while the prior art has heretofore aimed at locating the layers of highest-quality insulating material in immediate vicinity of the conductor, my invention requires that the highest-quality insulating layers of the insulating enclosure be disposed in the 50% equi-potential surface and consequently in the electrical middle of the insulation.

My invention is based upon the recognition that in a laminated insulation on a coaxial conductor assembly the pre-discharges due to the occurrence of space charges and tending to cause glow phenomena and ultimately a breakdown of the insulation, occur not directly at the conductor but in the above-mentioned zone of the 50% equi-potential surface. It has been found by comprehensive investigation that these pre-discharges in the range of the 50% equi-potential surface of the electric field are the cause for the breakdown of the insulation. This range of the 50% equi-potential surface, essential for the initiation of the pre-discharges is not constituted by the geometric middle of the laminated insulation but is rather constituted by the surface around the conductor that represents the locus of one and the same electric potential, this potential being one-half the value between the potential of the conductor and the potential of the external surface of the insulation.

Figure 2:
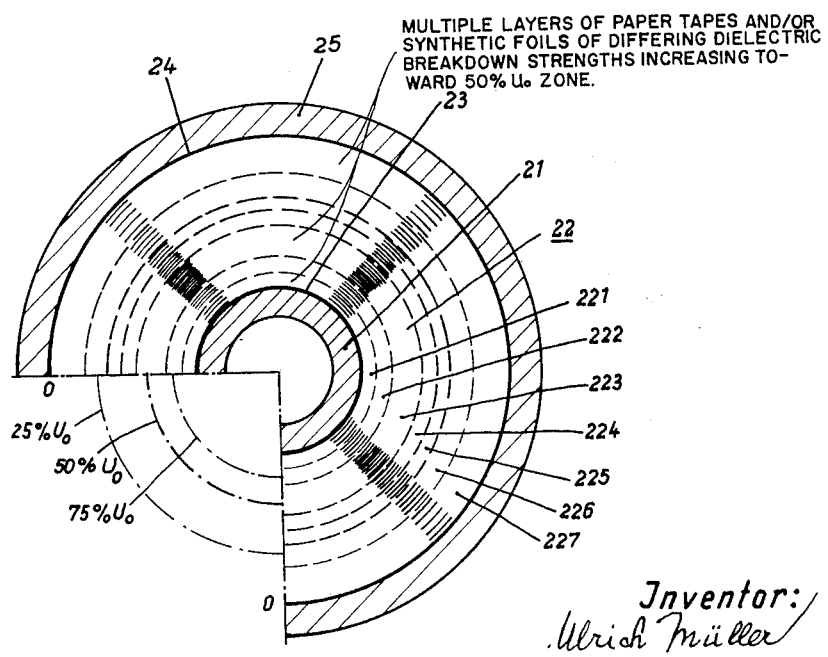

The invention will be further described with reference to the accompanying drawings in which:
FIG. 1 is an explanatory diagram of potential surfaces;
FIG. 2 shows schematically and in cross section an insulated concentric conductor according to the invention; and
FIGS. 3 to 6 illustrate respectively four other embodiments of insulated concentric conductors according to the invention by respective cross-sectional views.

For elucidating the above-mentioned 50% equi-potential surface, reference will be made to the diagram of FIG. 1 showing a quadrant of an insulation 2 cylindrically surrounding a metallic conductor 1 of circular cross section, these conditions obtaining, for example, in a single-wired cable having a round conductor 1 of copper. Since in this case the electric field has cylindrical configuration, the equi-potential surfaces of the electric potential constitute cylinders that concentrically surround the conductor 1 and whose position is defined by their distance $r$ from the center point of the conductor 1. Designated by $r_i$ is the radius of the metallic conductor 1 and by $r_a$ the radius of the outer surface of the insulation 2 and consequently the radius of the entire cable or cable component; then the line integral of the field strength in the cylindrical field permits expression the electric potential $U(r)$ at the location $r$ by the equation:

$$U(r) = \frac{U_0}{\ln \frac{r_a}{r_i}} \cdot \ln \frac{r_a}{r}$$

In this equation, $U_0$ denotes the potential of the conductor 1.

On the ordinate of FIG. 1, the full value of the potential $U_0$ is designated by 100%. Also entered on the ordinate are the values 75%, 50% and 25% of this potential. If the radii of the equi-potential surfaces correlated to these respective potential values are designated by $r_{75}$, $r_{50}$ and $r_{25}$, then the following values for the potential $U(r)$ are obtained from the foregoing equation:

$$r_{25} = \sqrt[4]{r_a^3 \cdot r_i}$$
$$r_{50} = \sqrt{r_a \cdot r_i}$$
$$r_{75} = \sqrt[4]{r_a \cdot r_i^3}$$

Reverting now to the invention, it is essential that the laminated insulation possesses in the range of the 50% equi-potential surface, and hence in the range of the electric middle value, a higher-quality insulation than in the other layers of the insulation. The thickness of the layer located according to the invention in the electrical middle and consisting of material of higher quality than in the other layers depends upon the particular requirements that are to be met by the laminated insulation as a whole. However, it is essential that the layers located more closely toward the conductor as well as the layer located more closely to the outer surface of the insulation consist of insulating materials which do not have the same high quality as the insulation of the layer in the 50% equi-potential surface.

In general, it is preferable, according to another feature of my invention, to graduate the adjacent layers with respect to their electrical quality. However, it is not advisable to have the layer which is located in the range of the 50% equi-potential surface, extend toward the conductor beyond the 75% equi-potential surface, nor to have the middle layer of high quality extend outwardly beyond the 25% equi-potential surface.

The graduation in quality of the insulating strata according to the invention can be obtained by composing the layer in the range of the 50% equi-potential surface from tapes or foils which are thinner than the tapes or foils used for building up the other layers of the insulation.

Another way of making an insulation according to the invention is to compose the layer in the range of the 50% equi-potential surface from tapes or foils consisting of synthetic material, but to form the other layers of the insulation from paper tapes.

For further elucidating the invention, reference will be made to the embodiments of stratified high-voltage insulated conductors illustrated in FIGS. 2 to 6.

FIG. 2 shows a single-conductor high-voltage cable for 220 kv. with laminated insulation. The conductor 21 of this cable has a diameter of 22 mm. and is designed as a hollow conductor whose interior is filled with oil. Placed directly upon the conductor 21 is metallized paper 23 to obtain a smooth conductor surface.

The metallized paper, applied in form of a helically wound tape, is surrounded by paper tapes which constitute several layers 22 and are impregnated with oil. This stratified zone of layers has a radial thickness of 20 mm. Placed upon this laminated insulation 22 is metallized paper 24 which is spun about the paper tape to act as a shield. Pressed upon the metallized paper 24 is the external jacket or sheath 25 consisting of lead.

The laminated insulation 22, having a total thickness of 20 mm., consists of seven layers 221 to 227 which are formed of paper tapes which have respectively different thickness and are sequentially spun about the conductor. The thickness of the paper tapes used for the laminated insulation 22 varies between 50 micron and 150 micron. The thin paper, having a thickness of 50 micron, has a high electric quality. In accordance with the invention, this paper of smallest thickness is located in the range of the 50% equi-potential surface and hence in the electrical middle, the position being indicated by a heavy dot-and-dash line in the left lower quadrant of FIG. 2. Also entered in the left lower quadrant of FIG. 2 are the 75% equi-potential surface and the 25% equi-potential surface, designated by lighter dot-and-dash lines.

In a typical example embodying the invention, the following values were employed for the thickness of the individual layers 221 to 227 as well as for the thickness of the paper tapes of which these respective layers were constituted:

| Layer No. | Layer Thickness (mm.) | Thickness of Paper Tape ($\mu$) |
|---|---|---|
| 221 | 2 | 125 |
| 222 | 2 | 75 |
| 223 | 4 | 50 |
| 224 | 2 | 75 |
| 225 | 2 | 105 |
| 226 | 3 | 125 |
| 227 | 5 | 150 |

According to an improvement feature of my invention, the desired effect can be augmented by inserting weakly conducting inserts, such as conducting foils, in the range of the 50% equi-potential surface of the electric field.

Figure 3:
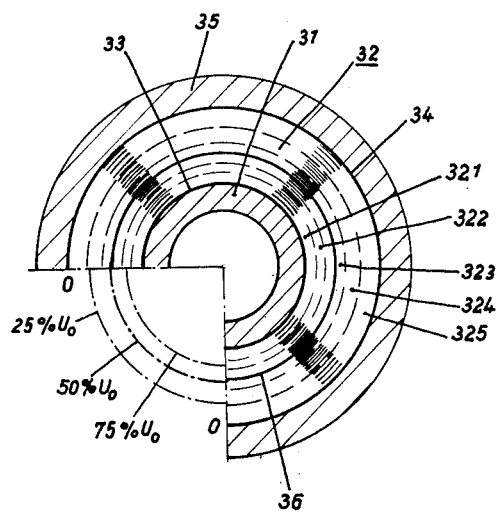

An embodiment of this type is represented in FIG. 3, showing a single-conductor high-voltage cable for 110 kv. The design of this cable, composed of a conductor 31, a laminated insulation 32, metallized paper tapes 33, 34 and an outer jacket 35, corresponds to the cable described above with reference to FIG. 2. The diameter of the conductor 31 is 22 mm. The laminated insulation 32 has a total thickness of 10 mm. It consists of five layers 321 to 325. The following values apply to the respective thicknesses of the layers 321 to 325 and to the thickness of the paper tapes that form these respective layers:

| Layer No. | Layer Thickness (mm.) | Thickness of Paper Tape ($\mu$) |
|---|---|---|
| 321 | 1.5 | 125 |
| 322 | 1 | 75 |
| 323 | 3 | 55 |
| 324 | 2 | 125 |
| 325 | 2.5 | 150 |

In accordance with the invention, the layer 323 in the region of the 50% equi-potential surface consists of thinner paper tapes than employed for the other layers 321, 322, 324 and 325. Located at the 50% equi-potential surface, and hence within the layer 323, is a weekly conducting insert 36 of carbon paper.

Figure 4:
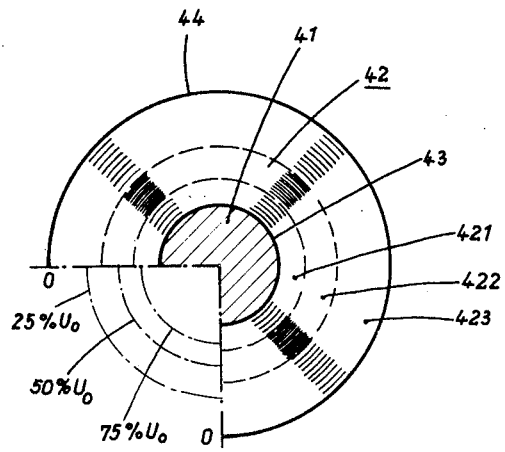
Figure 5:
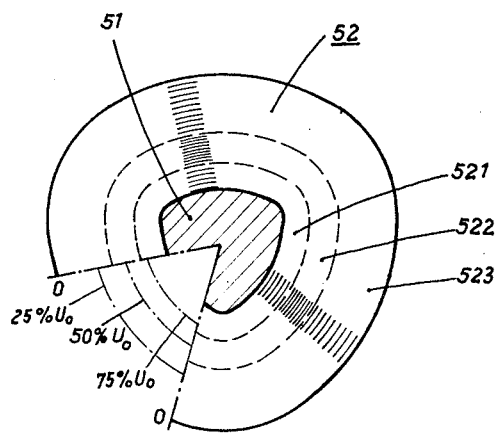

As mentioned, it is essential to the invention that the layer in the range of the 50% equi-potential surface is of higher dielectric breakdown strength than the other insulation. This can also be attained by forming the layer in the range of the 50% equi-potential surface from synthetic plastic foils or tapes, while employing paper tapes for the other layers. This is embodied in the example of FIG. 4, showing a laminated insulation of the type often employed in high-voltage equipment. A massive conductor 41, having a diameter of 16 mm., is surrounded by a laminated insulation 42 whose total thickness is 15 mm. and which consists of three layers 421 to 423. Placed upon the conductor 41 is conducting layer 43 for smoothing purposes, and placed upon the laminated insulation 42 is a conducting layer 44 consisting of metal mesh.

In accordance with the invention, the layer 422 on the 50% equi-potential surface consists of synthetic plastic foil on a polycarbonate base, whereas the other layers 421 and 423 are built up from paper tapes. With respect to the thickness of the layers 421 to 423, and relative to the thickness of the plastic foils and paper tapes, the following values apply:

| Layer No. | Layer Thickness (mm.) | Thickness of Paper Tape ($\mu$) | Material |
|---|---|---|---|
| 421 | 3.6 | 75 | Paper. |
| 422 | 4.0 | 30 | Polycarbonate. |
| 423 | 7.4 | 75 | Paper. |

Coaxial conductors with high-voltage insulation according to the invention need not necessarily be cylindrical. This is exemplified by the embodiment shown in FIG. 5, constituting an insulated bus bar with sector-shaped cross section for 220 kv. The sector-shaped massive conductor 51 of the bus is surrounded by a laminated insulation 52 of 15 mm. total thickness composed of three layers 521 to 523. As required by the invention, the insulating layer 522 on the 50% equi-potential surface consists of polycarbonate foils, whereas the insulation layers 521 and 523 consist of paper tapes. The thickness of the insulating layers 521 to 525 and those of the foils and tapes are as follows:

| Layer No. | Layer Thickness (mm.) | Tape or Foil Thickness ($\mu$) | Material |
|---|---|---|---|
| 521 | 3.6 | 75 | Paper. |
| 522 | 4.0 | 30 | Polycarbonate. |
| 523 | 7.4 | 75 | Paper. |

Figure 6:
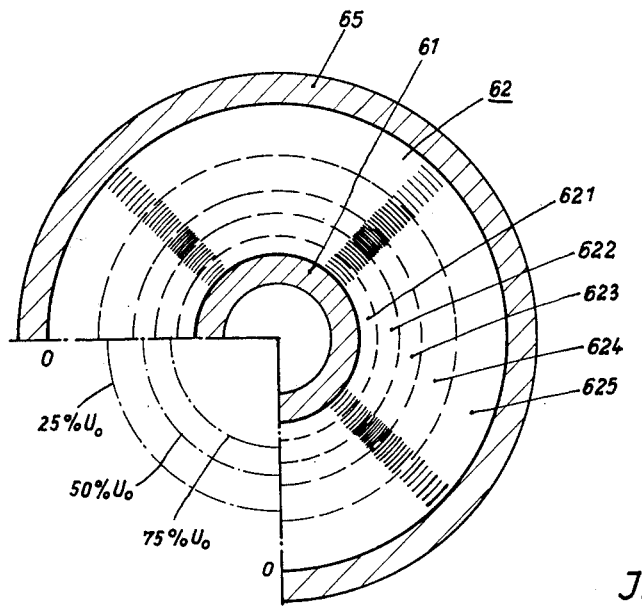

Another way of forming an insulated cable according to the invention is exemplified by the embodiment shown in FIG. 6. In this cable, the laminated insulation is composed only of synthetic plastic foils. The insulating layer on the 50% equi-potential surface consists of foils thinner than the other insulating layers. The single-conductor high-voltage cable shown in FIG. 6 is designed for 220 kv. Its hollow conductor 61 of 22 mm. diameter is surrounded by laminated insulation 62 upon which a jacket or sheath 65 of lead is extruded. The laminated insulation 62 consisting of five layers 621 to 625 is spun about the cable core from polycarbonate foils. The layer 623 in the range of the 50% equi-potential surface consists of polycarbonate foils that are thinner than the polycarbonate foils employed in the other layers. The thicknesses of the individual layers and of the foils are as follows:

| Layer No. | Layer Thickness (mm.) | Foil Thickness ($\mu$) |
|---|---|---|
| 621 | 2.3 | 60 |
| 622 | 3.0 | 40 |
| 623 | 3.0 | 25 |
| 624 | 4.7 | 40 |
| 625 | 5.0 | 60 |

It will be obvious to those skilled in the art, upon a study of this disclosure, that this invention permits of various modifications and alterations with respect to the individual components and arrangements disclosed, and hence can be embodied in cables other than as particularly illustrated and described herein, without departing from the essential features of the invention and within the spirit and scope of the claims annexed hereto.

I claim:

1. Laminated high-voltage insulation for coaxial electric conductors, including cables, lead-in bushings and insulated bus bars, comprisng a plurality of insulation layers, one of said layers being located in the range of the 50% equi-potential surface of the electric field of the conductor and comprising an insulating material which has higher dielectric breakdown than the insulating materials in said other layers of the insulation.

2. Insulation according to claim 1, the insulating material having the highest dielectric breakdown strength being located in a range having a maximum extent from the 75% equi-potential surface to the 25% equi-potential surface of the conductor.

3. Insulation according to claim 1, said layers of the insulation comprising insulating material which, starting in radially in one direction from the conductor and starting in the other direction from the external surface of the insulation, is gradually of higher dielectric breakdown strength, from layer to layer, in both said directions toward the range of said 50% equi-potential surface.

4. Insulation according to claim 1, at least some of said layers being formed of wound tape members, said layer located in the range of the 50% equi-potential surface of the electric field being formed of a tape thinner than the members forming the other layers of the insulation.

5. Insulation according to claim 4, the tapes located in the range of the 50% equi-potential surface comprising a synthetic polycarbonate foil material, and the other layers of the insulation comprising paper tapes.

6. Insulation according to claim 1, including a weakly conducting insert intermediate said insulation layer and located in the range of the 50% equi-potential surface.

References Cited by the Examiner

UNITED STATES PATENTS

| 1,583,766 | 5/26 | Atkinson | 174—73 |
| 2,155,403 | 4/30 | Cook | 174—121 X |
| 2,717,917 | 9/55 | Genberg | 174—121 X |
| 2,782,248 | 2/57 | Clark | 174—120 X |
| 2,967,902 | 1/61 | Pasini | 174—120 X |
| 3,019,285 | 1/62 | Lutis | 174—121 X |

FOREIGN PATENTS 112,537   3/29   Austria.

JOHN P. WILDMAN, *Primary Examiner.*